United States Patent [19]

White et al.

[11] Patent Number: 5,071,160
[45] Date of Patent: Dec. 10, 1991

[54] PASSENGER OUT-OF-POSITION SENSOR

[75] Inventors: Craig W. White, Grosse Pointe; Leonard W. Behr, Pontiac, both of Mich.

[73] Assignee: Automotive Systems Laboratory, Inc., Farmington Hills, Mich.

[21] Appl. No.: 573,537

[22] Filed: Aug. 27, 1990

Related U.S. Application Data

[63] Continuation-in-part of Ser. No. 415,720, Oct. 2, 1989, Pat. No. 4,951,963.

[51] Int. Cl.$^5$ .............................................. B60R 21/32
[52] U.S. Cl. ..................................... 280/735; 280/731; 180/268; 180/282
[58] Field of Search ............... 280/730, 734, 735, 731; 180/268, 282

[56] References Cited

U.S. PATENT DOCUMENTS 3,753,475  8/1973  Andersen et al. ................... 280/735
3,767,002 10/1973  Gillund .............................. 280/735

*Primary Examiner*—Kenneth R. Rice
*Attorney, Agent, or Firm*—Lyon & Delevie

[57] ABSTRACT

A circuit for a actuating a vehicle passenger safety restraint such as an air bag includes pyroelectric sensors, pressure transducers, and ultrasonic acoustic sensors for sensing the presence, weight, and relative position of the passenger within a vehicle, respectively, which information is supplied to a control module controlling operation of the restraint. The control module, which includes processor means, calculates the likely effectiveness of the restraint in preventing or otherwise mitigating injury to the vehicle passenger in the event of subsequent operation of the restraint. A signal lamp is illuminated by the control module in the event that the passenger assumes a position which reduces the calculated likely effectiveness of the restraint below a threshold level therefor, thereby warning the passenger of the heightened risk of injury. Preferably, the control module uses the information generated by the sensors to supplement or otherwise corroborate other information received from inertia-type "crash" sensors or frangible "crush" sensors, thereby ensuring operation of the restraint only in those instances where the passenger is indeed placed as risk. Most preferably, the restraint is capable of providing a variable response, and the control module adjusts the response of the restraint prior to triggering the operation thereof so as to provide maximum protection to the passenger against injury.

19 Claims, 1 Drawing Sheet

PASSENGER OUT-OF-POSITION SENSOR

CROSS-REFERENCE TO RELATED APPLICATIONS

The instant application is a continuation-in-part of co-pending U.S. patent application Ser. No. 415,720, filed Oct. 2, 1989, now U.S. Pat. No. 4,951,963, by the same parties and assigned to the assignee of the instant invention.

BACKGROUND OF THE INVENTION

The instant invention relates to control circuitry for a vehicle passenger safety restraint, such as an air bag, seat-belt tensioner, adjustable knee bolster, etc., which includes means for sensing the presence, size, and position of vehicle passengers for the purposes of 1) warning a passenger in the event that he assumes a position within the vehicle likely to significantly reduce the effectiveness of the restraint should it become necessary to subsequently actuate or deploy the restraint, e.g., in the event of a vehicle collision or marked vehicle deceleration; 2) inhibiting operation of the restraint in the event that such restraint operation is likely to cause greater injury to the passenger than might otherwise result from unimpeded passenger contact with fixed interior structures of the vehicle; 3) corroborating vehicle acceleration data generated by other sensors, such as inertia-type crash sensors and/or frangible crush sensors located in the longitudinal crush zones of the vehicle, by observing changes in the sensed positions of the passenger over time; and, most preferably, 4) adjusting the response level of the restraint so as to provide maximum protection for the passenger upon ultimate deployment thereof, given the size of the passenger and his assumed position within the vehicle.

It is well known that the size and relative position of each passenger within a motor vehicle at the instant preceding a collision or marked vehicle deceleration is of critical importance to the effectiveness of safety restraints such as air bags in preventing serious injury. Specifically, known safety restraints operate to slowly decelerate each passenger relative to fixed interior structures of the vehicle, such as its steering wheel, dashboard, knee bolsters, etc., in order to avoid the high loads which would otherwise result from unimpeded contact of the passenger therewith. The size and position of each passenger within the vehicle at the instant before the operation of the restraint are thus critical in determining the rate at which the passenger must be decelerated relative to such fixed interior structures by the restraint in order top prevent such injurious contact therewith. The relationship between passenger size and position, and proper operation of the restraint becomes even more critical when the restraint is deployed from one such fixed interior structure, as where an air bag is deployed from the steering wheel hub or a dashboard compartment, and the passenger leans towards or otherwise assumes a position proximate thereto, thereby requiring a higher rate of passenger deceleration in order to prevent deleterious contact between the passenger and the vehicle's fixed interior structures.

Additionally, under certain circumstances known to one skilled in the art, such as in the "standing child" scenario, the injury likely to be suffered by an "out-of-position" passenger as a result of the deployment of the restraint may well exceed the injury which might otherwise result from unimpeded passenger contact with fixed interior structures. In such cases, the operation of the restraint is preferably inhibited.

The prior art has heretofore failed to provide a means for indicating to a vehicle passenger the fact that he has assumed a position within the vehicle likely to reduce the effectiveness of a safety restraint and, hence, likely to result in greater injury should operation of the restraint be subsequently required. In other words, under the prior art, an out-of-position passenger has not been afforded the opportunity to reposition himself within the vehicle so that he might be maximally protected against injury in the event of a subsequent crash or marked vehicle deceleration. Rather, the prior art approach has focussed on simply reminding the passenger to use "active" restraints, such as manual seat-belts, as through the use a seat switch which closes to complete a portion of a warning circuit, whereby a visual or audible warning is generated in the event that a second switch in the belt's latching mechanism has not been closed.

The prior art has also sought to match the response of a safety restraint such as an air bag to the sensed rate of vehicle deceleration. Specifically, the prior art teaches the use of air bag inflator assemblies comprising a plurality of individually-triggerable gas-generating cartridges, which cartridges are selectively triggered based upon the rate of vehicle deceleration sensed by at least one inertial sensor. This approach fails, however, to adjust safety restraint response to account for passenger size or position; and there is no accommodation of situations such as that of the "standing child", where operation of the restraint is preferably inhibited.

Alternatively, the prior art has adjusted the threshold vehicle deceleration that is required for triggering operation of one restraint in response to the detected use of another passenger restraint employed within the vehicle. For example, U.S. Pat. No. 4,804,859 to Swart teaches a trigger circuit for an air bag whose firing path incorporates one of a pair of crash sensors having different acceleration thresholds based upon passenger seat-belt usage. Thus, where the passenger fails to utilize his seat belt, the lower-threshold crash sensor will be employed to trigger the deployment of the air bag upon sensing an acceleration exceeding its threshold value. Significantly, the triggered response of the air bag safety restraint taught by Swart remains the same, regardless of seat-belt usage; the passenger is not warned, for example, of the reduced likely effectiveness of both his seat-belt and the air bag as he leans forward to adjust a knob on the dashboard; and, once again, there is no accommodation of the "standing child" and other like scenarios.

SUMMARY OF THE INVENTION

It is an object of the instant invention to provide a control circuit for a vehicle passenger safety restraint, such as an air bag, including means for sensing the position of the passenger within the vehicle relative to fixed interior structures thereof, and indicator means responsive to the position sensing means for warning the passenger if the position he has assumed within the vehicle significantly reduces the likely effectiveness of the restraint, should a subsequent collision or marked vehicle deceleration require its deployment.

Another object of the instant invention is to provide a control circuit for a vehicle passenger safety restraint including means for sensing the relative position of the passenger within the vehicle, and means responsive to the position sensing means for inhibiting operation of the restraint if the likely injury attendant to operation of the restraint is greater than the likely injury attendant to unimpeded passenger contact with fixed interior structures of the vehicle, given the position assumed by the passenger therein.

Yet another object of the instant invention is to provide a control circuit for a passenger safety restraint including means for sensing the rate of movement of vehicle passengers relative to the vehicle's fixed interior structures, which rate of passenger movement is used to corroborate vehicle acceleration data provided by at least one other vehicle acceleration sensor, thereby ensuring operation of the restraint only when the passenger is indeed placed at risk of substantial injury.

A further object of the instant invention is to provide a control circuit for a vehicle passenger safety restraint including means for sensing the position assumed within the vehicle by the passenger relative to fixed interior structures therein, and means for responsive to the position sensing means for adjusting the response of the safety restraint to accommodate the position that the vehicle passenger has assumed at the instant the restraint is deployed or actuated, whereby protection of the passenger is optimized.

Under the instant invention, a control circuit for a vehicle passenger safety restraint comprises first means for sensing a condition requiring operation of the restraint, such as a collision or marked vehicle deceleration exceeding a threshold value therefor; trigger means responsive to the first sensing means for actuating the restraint; second means for sensing the position assumed by the passenger within the vehicle relative to fixed interior structures thereof; processor means responsive to the second sensing means for calculating the likely effectiveness of the restraint in preventing injury to the passenger in the event of the subsequent operation thereof, given the position assumed by the passenger within the vehicle; and indicator means, such as a signal lamp, responsive to the processor means for warning the passenger when the calculated likely effectiveness of the restraint falls below a threshold value therefor.

In the preferred embodiment of the instant invention, the processor means inhibits operation of the restraint when it calculates that the likely injury to the passenger attendant to such operation of the restraint exceeds the likely injury to the passenger attendant to unimpeded passenger contact with fixed interior structures within the vehicle, given the position assumed by the passenger therein. Additionally, the processor means samples the sensed passenger position at fixed time intervals and calculates therefrom the rate of movement of the passenger relative to the fixed interior structures of the vehicle. The thus calculated relative speed of the passenger within the vehicle is used to corroborate the information from the first sensing means with regard to identification of an event requiring operation of the restraint.

In accordance with another feature of the instant invention, the safety restraint is capable of providing a variable response, as by providing two or more rates at which the restraint may operate to decelerate the movement of vehicle passengers relative to fixed interior structures of the vehicle; and the trigger means selects the appropriate level of restraint response so as to maximize the likely effectiveness of the restraint in preventing injurious contact of the passengers with the vehicle's interior.

DETAILED DESCRIPTION OF THE PREFERRED EMBODIMENT OF THE INVENTION

Figure 1:
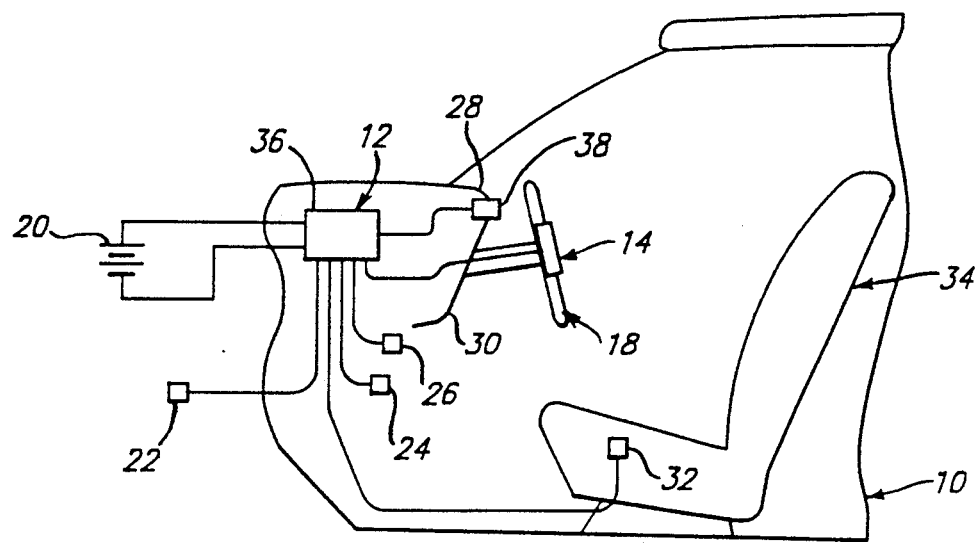
FIG. 1 is a diagrammatic schematic, partially cutaway, of a motor vehicle having incorporated therein an air bag safety restraint whose control circuit includes a signal lamp for indicating to a vehicle passenger those instances where he has assumed a position within the vehicle likely to significantly reduce the likely effectiveness of the air bag, in accordance with the instant invention.
Figure 2:
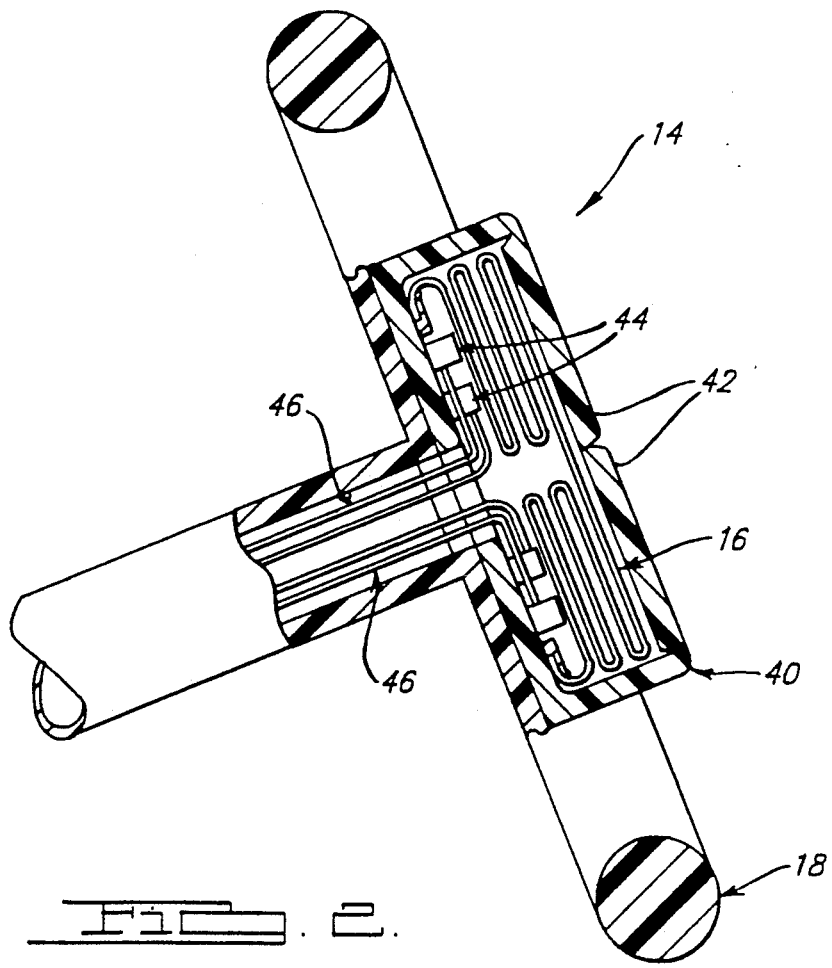
FIG. 2 is an enlarged view of the steering wheel shown in FIG. 1 having attached thereto an air bag inflator assembly which includes a plurality of individually-triggerable gas-generating cartridges capable of varying the inflation profile of the air bag and, thus, tailor the response of the instant safety restraint so as to provide maximum passenger protection notwithstanding the possibly disadvantageous position assumed by the passenger within the vehicle.

Referring to FIGS. 1 and 2, an exemplary air bag safety restraint system for protecting a passenger of a motor vehicle 10 against injurious contact with fixed interior surfaces thereof comprises a control circuit indicated generally at 12; and an air bag inflator assembly 14, including an air bag 16, mounted on the vehicle's steering wheel 18 so as to be positioned generally in opposition with the passenger when the passenger is nominally situated within the vehicle 10.

The control circuit 12, which is powered as by the vehicle's main battery 20, includes an inertia-type crash sensor 22 for sensing a vehicle deceleration exceeding a threshold value therefor, whereby an event requiring deployment of the air bag 16 is identified; a pyrotechnic sensor 24 for sensing the presence of a passenger (not shown) within the vehicle to be protected by the system; an ultrasonic acoustic sensor 26 comprising an ultrasonic transmitter and detector for sensing the position assumed by the passenger relative to various fixed interior structures of the vehicle, such as the vehicle's steering wheel 16, dashboard 28, and knee bolsters 30; a pressure transducer 32 mounted in the vehicle 10 at a location therein nominally beneath the passenger when he is situated therein, i.e., within the passenger's seat 34, to sense the approximate weight of the passenger; and a control module 36 in communication with the sensors 22, 24, 26, 32 which controls the operation of the inflator assembly 14 and, hence, triggers deployment of the air bag 16 therein.

The instant control circuit 12 additionally comprises indicator means, such as a signal lamp 38, mounted in a conspicuous place within the vehicle 10, such as on portion of the vehicle's dashboard 28. The control module 36 illuminates the signal lamp 38 upon calculating that the likely effectiveness of the air bag 16 in preventing injurious contact between the passenger and fixed interior structures of the vehicle, in the event of subsequent deployment thereof, has fallen below a threshold value therefor, given the sensed position of the passenger within the vehicle 10. The signal lamp 38 is also illuminated when the control module 36 alternatively calculates that the likely injury to the passenger attendant to deployment of the air bag 16 itself is greater than the likely injury to the passenger attendant to his unimpeded contact with the vehicle's steering wheel 18, dashboard 28, knee bolster 30, etc., should subsequent deployment of the air bag 16 be required. In this manner, the vehicle passenger is warned of the heightened risk of injury associated with the position he has assumed within the vehicle 10 and, hence, is afforded an opportunity to assume a less problematic position within the vehicle 10 prior to a collision or marked vehicle deceleration requiring deployment of the air bag 16.

The control module 36 further samples the sensed position of the passenger at fixed time intervals to calculate the rate of movement of the passenger relative to various fixed interior structures of the vehicle 10. The resulting calculated rate of relative passenger movement is thereafter used to corroborate the acceleration data communicated to the control module 34 by the crash sensor 22, thereby ensuring deployment of the air bag 16 only where the passenger is indeed placed at substantial risk of injury.

Referring to FIG. 2, the inflator assembly 14 further comprises a housing 40 having a pair of break-away panels 42 forming the side thereof in opposition with the passenger when the passenger is nominally situated within the vehicle 10; and a plurality of gas-generating cartridges 44 mounted within the housing 40 in a manner so as to permit the direction of the gases generated thereby into the open end of the air bag 16 and, thus, inflate same through the break-away panels 42 of the housing 40.

In accordance with another feature of the instant invention, each gas-generating cartridge 44 is provided with its own igniter which typically comprises a pyrotechnic charge (not shown), each of which may be individually and independently triggered by the control module 36 via control wires 46. Upon detecting the occurrence of an event requiring deployment of the air bag 16, and upon confirming the desirability of same given the instantaneous position assumed by the passenger within the vehicle 10, the control module 36 triggers the ignition of at least one of the cartridges 44 to cause initial deployment of the air bag 16, whereupon the control module 36 sequentially triggers the ignition of additional cartridges 42 as required to provide an air bag inflation profile which affords maximum protection to the passenger, based upon his size and his position within the vehicle 10 at the moment immediately preceding the event requiring deployment of the air bag 16.

Preferably, the instant control circuit 12 uses error correction methods such as a plurality of each type of sensors 22, 24, 26, 32 for each assigned monitoring task to prevent falsing. For example, the action of the passenger reaching for the control knobs of a dashboard-mounted radio must not be interpreted as an event requiring deployment of the air bag 16. Accordingly, the instant control circuit 12 preferably employs redundant sensors for each assigned monitoring task, and the instructions executed by the control module 34 include error correction subroutines known to one skilled in the art.

While the preferred embodiment of the invention has been disclosed, it should be appreciated that the invention is susceptible of modification without departing from the spirit of the invention or the scope of the subjoined claims. For example, it will be readily appreciated that additional inflator assemblies 14 responsive to the control module 36 may be mounted on the vehicle's dashboard 28 or other fixed interior structures of the vehicle 10 for use in preventing injurious contact of other vehicle passengers with such other fixed vehicle interior structures. Additionally, the control module 36 may further communicate with other safety restraints such as seat-belt tighteners, adjustable knee bolsters, etc., both prior to and subsequent to the detection of an event requiring deployment of the air bag 16, thereby affording the passenger an additional measure of protection against injury.

We claim:

1. In a motor vehicle, a circuit for actuating a passenger restraint operative to prevent injurious contact between a vehicle passenger and a fixed interior structure of said vehicle, said circuit comprising:

first means for sensing a condition requiring operation of said restraint;

trigger means responsive to said first sensing means for actuating said restraint;

second means for sensing the position assumed by said passenger within said vehicle relative to a fixed interior structure thereof;

processor means responsive to said second sensing means for calculating the likely effectiveness of said restraint in preventing injury to said passenger in the event of subsequent operation thereof, given the position assumed by said passenger within said vehicle; and indicator means responsive to said processor means for warning said passenger when said calculated likely effectiveness of said restraint falls below a threshold value therefor.

2. The circuit of claim 1 wherein said second sensing means includes an ultrasonic sensor.

3. The circuit of claim 1 wherein said second sensing means comprises an pyroelectric sensor.

4. The circuit of claim 1 wherein said second sensing means includes a pressure transducer mounted in said vehicle at a location therein nominally beneath said passenger when said passenger is situated therein.

5. The circuit of claim 1 wherein said restraint is capable of a plurality of response levels, said trigger means being responsive to said processor means so as to select one of said plurality of restraint response levels to maximize said calculated likely effectiveness of said restraint.

6. The circuit of claim 5 wherein said restraint includes a plurality of independently-triggerable gas-generating cartridges, said trigger means selecting said one of said plurality of restraint response levels by selectively triggering said cartridges.

7. The control circuit of claim 6 wherein said cartridges are sequentially triggered by said trigger means, said trigger means selecting said one of said plurality of restraint response levels by varying the time interval between the sequential triggering of at least two of said cartridges.

8. The control circuit of claim 1 wherein said processor means calculates the velocity of said passenger relative to said fixed interior structures, said trigger means being further responsive to said processor means to actuate said restraint when said calculated passenger velocity exceeds a threshold level therefor.

9. The control circuit of claim 1 wherein said processor means prevents operation of said restraint when said processor means calculates the likely injury to said passenger attendant to such operation of said restraint exceeds the likely injury to said passenger attendant to unimpeded passenger contact with said fixed interior structure, given said position assumed by said passenger within said vehicle relative to said fixed interior structure.

10. In a motor vehicle, a circuit for actuating a passenger restraint operative to decelerate the movement of a passenger within said vehicle relative to a fixed interior structure thereof, said circuit comprising:
 first means for sensing deceleration of said vehicle exceeding a threshold value therefor;
 trigger means responsive to said first sensing means for actuating said restraint;
 second means for sensing the position assumed by said passenger within said vehicle relative to said fixed interior structure thereof; and
 indicator means responsive to said second sensing means for warning said passenger when said assumed position significantly reduces the likely effectiveness of said restraint in decelerating the movement of said passenger relative to said fixed interior structure upon subsequent operation thereof.

11. The circuit of claim 10 wherein said restraint is capable of decelerating the movement of said passenger relative to said fixed interior structure at two or more different deceleration rates, said trigger means selecting one of said deceleration rates in response to said second sensing means prior to actuating said restraint.

12. The circuit of claim 10 including means responsive to said second sensing means for inhibiting operation of said restraint when the likely injury to said passenger attendant to operating said restraint is greater than the likely injury to said passenger attendant to unimpeded passenger contact with said fixed interior structure, given said assumed position of said passenger within said vehicle.

13. A system for protecting a passenger of a motor vehicle against injurious contact with fixed interior structures of said vehicle, said system comprising:
 first means for sensing deceleration of said vehicle exceeding a threshold value therefor;
 second means for sensing the position assumed by said passenger within said vehicle relative to said fixed interior structures;
 passenger restraint means mounted on one of said fixed interior structures operative to decelerate the movement of said passenger relative thereto at one of a plurality of different deceleration rates; and
 trigger means responsive to said first sensing means for triggering operation of said restraint, said trigger means selecting said one of said restraint's operative passenger-deceleration rates in response to said second sensing means prior to triggering operation of said restraint.

14. The system of claim 13 wherein said restraint means comprises a plurality of individually-triggerable gas-generating cartridges, said cartridges being selectively triggered by said trigger means to provide said plurality of said restraint's operative passenger-deceleration rates.

15. The system of claim 14 wherein said cartridges of said restraint are sequentially triggered at predetermined time intervals by said trigger means, said trigger means selecting said one of said restraint's operative passenger-deceleration rates by varying said time intervals.

16. The system of claim 13 including third means for sensing the weight of said passenger, said trigger means further responding to said third sensing means in selecting said one of said restraint's operative passenger-deceleration rates prior to triggering operation of said restraint.

17. The system of claim 13 including indicator means responsive to said second sensing means for indicating when the position assumed by said passenger significantly reduces the likely effectiveness of said restraint in decelerating the movement of said passenger relative to said fixed interior structures upon operation thereof at said selected one of said restraint's operative passenger-deceleration rates.

18. The control circuit of claim 13 including processor means responsive to said second sensing means for calculating the velocity of said passenger relative to said fixed interior structures, said trigger means actuating said restraint when said calculated relative passenger velocity exceeds a threshold value therefor.

19. The control circuit of claim 13 wherein said trigger means prevents operation of said restraint when the likely injury to said passenger attendant to the actuation of said restraint is greater than the likely injury to said passenger due to unimpeded contact with said fixed interior structures, given said position assumed by said passenger within said vehicle relative to said fixed interior structure.

* * * * *